United States Patent
Kuroiwa et al.

(10) Patent No.: US 6,647,405 B1
(45) Date of Patent: Nov. 11, 2003

(54) ADDER CIRCUIT, INTEGRATING CIRCUIT WHICH USES THE ADDER CIRCUIT, AND SYNCHRONISM DETECTION CIRCUIT WHICH USES THE INTEGRATING CIRCUIT

(75) Inventors: Koichi Kuroiwa, Kawasaki (JP); Shoji Taniguchi, Kawasaki (JP); Masami Kanasugi, Kawasaki (JP); Mahiro Hikita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/522,404

(22) Filed: Mar. 9, 2000

(30) Foreign Application Priority Data

Mar. 17, 1999 (JP) .............................. 11-072629

(51) Int. Cl.[7] .............................................. G06F 7/50
(52) U.S. Cl. ....................................... 708/700; 708/710
(58) Field of Search ................................ 708/518, 711, 708/714, 670, 190, 672; 377/116

(56) References Cited

U.S. PATENT DOCUMENTS

| | | | | |
|---|---|---|---|---|
| 3,098,153 A | | 7/1963 | Heijn ......................... | 708/707 |
| 3,138,703 A | | 6/1964 | Maley ......................... | 708/703 |
| 3,932,734 A | * | 1/1976 | Parsons ........................ | 708/190 |
| 3,970,833 A | * | 7/1976 | Gehweiler et al. .......... | 708/190 |
| 4,052,604 A | * | 10/1977 | Maitland et al. ............ | 708/672 |
| 4,682,303 A | * | 7/1987 | Uya .............................. | 708/714 |
| 4,707,800 A | * | 11/1987 | Montrone et al. .......... | 708/518 |
| 4,817,031 A | * | 3/1989 | Tokumaru .................... | 708/711 |
| 4,860,242 A | * | 8/1989 | Ikumi ........................... | 708/670 |
| 5,337,269 A | * | 8/1994 | McMahan et al. .......... | 708/711 |
| 5,544,085 A | * | 8/1996 | Sali et al. .................... | 708/711 |
| 6,031,887 A | * | 2/2000 | Kolagotla et al. .......... | 377/116 |

FOREIGN PATENT DOCUMENTS

EP 0 797 315 A 9/1997
JP 9-167081 6/1997

OTHER PUBLICATIONS

M. W. Allam et al., Low Power Implementation of Fast Addition Algorithms, 1998, IEEE, p. 645–647.*
"Design and Analysis of Asynchronous Adders", Johnson et al, *IEEE Proceedings, Computers and Digital Techniques*, vol. 145, No. 1, Jan. 1, 1998.
"Statistical Carry Lookahead Adders", De Gloria et al, *IEEE Transactions on Computers*, vol. 45, No. 3, Mar. 1, 1996.

* cited by examiner

*Primary Examiner*—Chuong Dinh Ngo
*Assistant Examiner*—Chat Do
(74) *Attorney, Agent, or Firm*—Arent Fox Kintner Plotkin & Kahn, PLLC.

(57) ABSTRACT

An adding circuit which receives addend data and augend data, each of which consists of a plurality of bits, and sums the addend and augend data, comprises: a plurality of addition blocks, each of which is used to add a predetermined number of bits of the addend data to a like number of bits of the augend data, and for outputting both the result obtained by adding the predetermined number of bits and a carry-out signal, wherein, when a carry-out occurs for one of the addition blocks, in accordance with a carry-out signal from a lower rank and a set comprising the addend data and the augend data, the pertinent addition block responds to the pertinent carry-out, and wherein, when a carry-out does not occur for the addition block in accordance with the set comprising the addend data and the augend data, the pertinent addition block responds to the carry-out and generates a block addition end signal which indicates that the addition performed by the addition block has been completed.

15 Claims, 9 Drawing Sheets

1 bit Adder True Value Table

| AO | BO | CI | SO | CA |
|----|----|----|----|----|
| 0  | 0  | 0  | 0  | 0  |
| 1  | 0  | 0  | 1  | 0  |
| 0  | 1  | 0  | 1  | 0  |
| 1  | 1  | 0  | 0  | 1  |
| 0  | 0  | 1  | 1  | 0  |
| 1  | 0  | 1  | 0  | 1  |
| 0  | 1  | 1  | 0  | 1  |
| 1  | 1  | 1  | 1  | 1  |

ADDER CIRCUIT, INTEGRATING CIRCUIT WHICH USES THE ADDER CIRCUIT, AND SYNCHRONISM DETECTION CIRCUIT WHICH USES THE INTEGRATING CIRCUIT

BACKGROUND OF THE INVENTION

1. Field of the Invention

The present invention relates to an adder circuit, an integrating circuit which uses the adder circuit, and a synchronism detection circuit which uses the integrating circuit. In particular, the present invention pertains to an adder circuit, an integrating circuit using such an adder circuit, and a synchronism detection circuit using such an integrating circuit, which can perform addition or integral calculations or can establish synchronism.

2. Related Arts

In order to cope with the increased number of digital portable telephones users, the CDMA (Code Division Multiple Access) system, which can allocate more channels to limited frequencies, has been proposed as a communication system. The CDMA system adds a diffusion code consisting of a plurality of bits to transmission data in order to allocate, for a single frequency, the number of channels which corresponds to the number of types of diffusion codes. A common diffusion code, established between a transmission side and a reception side, is employed by the transmission side to modulate data to be transmitted, while the reception side employs the diffusion code to demodulate the received data.

In this case, the reception side must establish synchronism to detect the timing for allocation of the diffusion code. Generally, synchronism is established by using a matched filter. That is, inverse diffusion is effected by performing integral damping, using a diffusion code, for a received signal which is diffused by the diffusion code. The timing at which an integral value reaches a predetermined peak value is detected as synchronous timing. Therefore, the matched filter must perform integral calculations.

However, a conventional integrating circuit has flip-flops at the front and at the rear stages of an adder circuit for temporarily latching input bits and output bits. In synchronism with a predetermined clock, the integrating circuit repeats an addition sequence by which addend data are added to integral augend data, and latches newly obtained data at the flip-flop at the rear stage. In other words, basically the integrating circuit performs integral calculations by repeating the addition sequence each clock cycle. For this reason, clock cycle timing must be so set that the length of each cycle corresponds to the length of the addition sequence that will take the longest time to perform. As a result, even when a specific addition sequence is completed early, the integrating circuit can not immediately begin the next addition sequence, but must wait for the next clock.

When a matched filter using the above integrating circuit is employed for a portable telephone, the frequency of an operating clock can not be increased because of the need to save power, due to an inherent requirement for a portable telephone. Therefore, even if an adder can perform an operation quickly, or even if a data addition sequence should be completed in as short a time as possible, since the frequency of the operating clock is low, the time needed to perform an integral calculation for which a number of addition sequences are required can not be shortened.

SUMMARY OF THE INVENTION

It is, therefore, one objective of the present invention to provide an integrating circuit for which the integral calculation time can be shortened without depending on clock speed.

It is another objective of the present invention to provide a synchronism detection circuit which can establish synchronism in a shorter time without depending on clock cycles.

To achieve the above objectives, according to the present invention, an adder circuit, which receives addend data and augend data, each of which consists of a plurality of bits, and sums said addend and augend data, comprises:

a plurality of adder blocks, for adding a predetermined number of bits of said addend data to a like number of bits of said augend data, and for outputting both the addition result having said predetermined number of bits and a carry-out signal, wherein, each adder blocks generates a block addition end signal which indicates that the addition performed by said adder block has been completed, in response to a carry-out thereof, when the carry-out occurs, in accordance with a set of a carry-out signal from a lower adder block, said addend data and said augend data; and not in response to the carry-out thereof, when the carry-out does not occur in accordance with said set.

According to the present invention, block addition end signals are received from the plurality of adder blocks, and in response to the timing at which all the block addition end signals indicate addition was completed, an addition end signal for the adder circuit is generated.

Further, according to the present invention, in response to a block addition end signal from the highest adder block, the addition end signal for the adder circuit is generated.

Furthermore, according to the adder circuit above, since a block addition end signal indicating a calculation has been completed is generated by all the adder blocks, the timing at which addition is completed, being different depending on the addend data and augend data set, can be detected.

In addition, to achieve the above objectives, according to the present invention, an integrating circuit comprises:

an adder circuit as described above;

an addend data input buffer for recording addend data; and an addition result buffer for recording the results of addition and for outputting addend data, wherein, in response to the addition end signal, the addend data and the augend data are supplied from the addition data input buffer and the addition result buffer to the plurality of adder blocks.

Since the integrating circuit of the present invention performs a plurality of additions by itself, the integral calculation time can be reduced.

Furthermore, to achieve the above objectives, according to the present invention, A synchronism detection circuit, which detects the synchronism of diffusion code for a received signal subject to a code diffusion, comprises:

an integrating circuit as described above;

a plurality of delay circuits, each of which delays said received signal having a plurality of bits; and a plurality of multiplication circuits for multiplying by the outputs of said plurality of delay circuits and the diffusion code having a plurality of bits respectively, wherein the outputs of said multiplication circuits are accumulated by said integrating circuit, and said synchronism is detected according to the accumulation result.

DETAILED DESCRIPTION OF THE PREFERRED EMBODIMENT

The preferred embodiment of the present invention will now be described while referring to the accompanying drawings. It should be noted, however, that the technical scope of the present invention is not limited to this embodiment.

Figure 1:
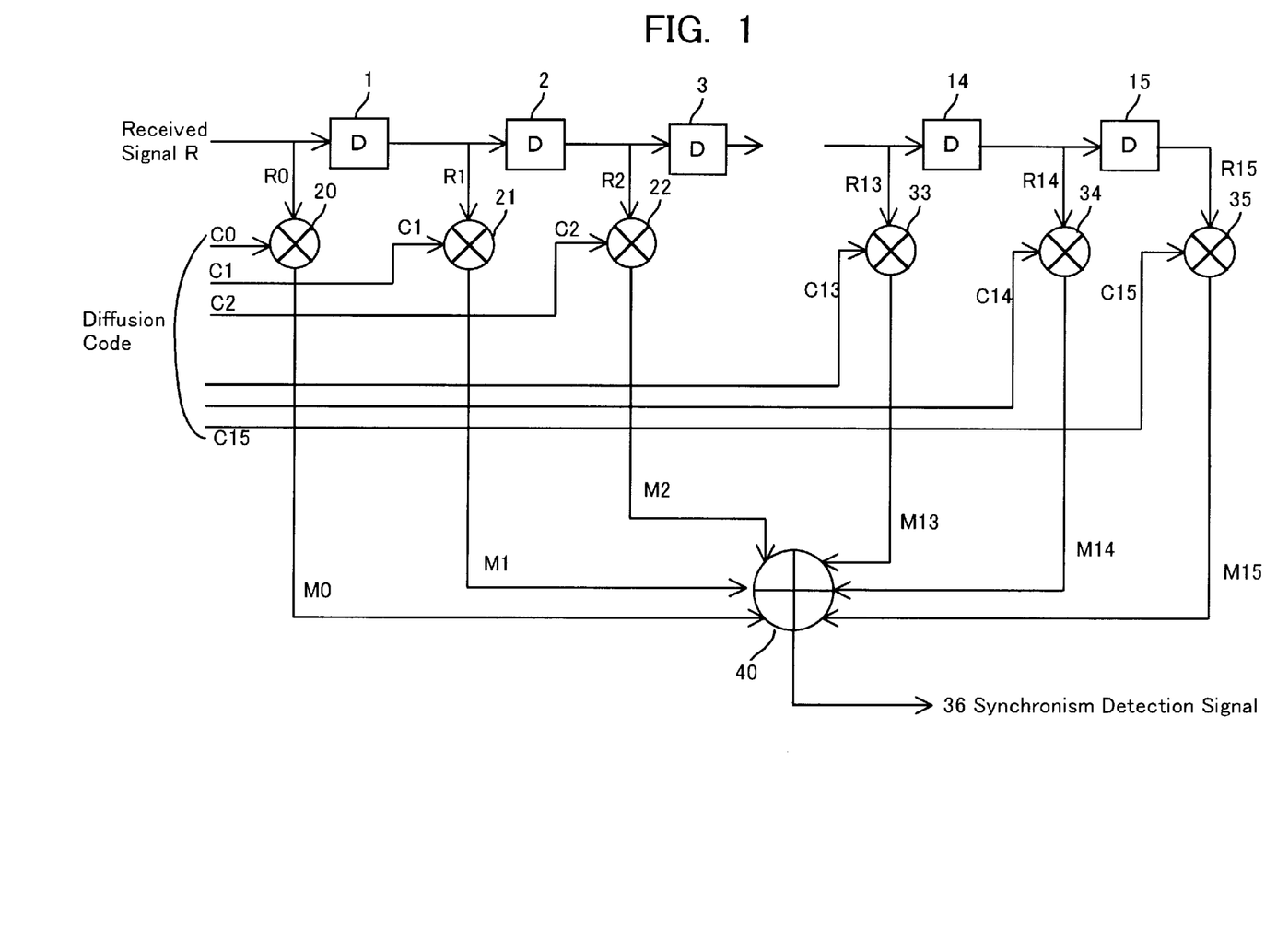
FIG. 1 is a diagram showing the arrangement of a synchronism detection circuit according to one embodiment of the present invention.

FIG. 1 is a diagram showing the arrangement of a synchronism detection circuit according to one embodiment of the present invention. A transmission signal modulated by the code diffusion system is generated by multiplying the transmission data by a diffusion code having a plurality of bits. A reception side which receives the transmission signal must detect the synchronism of the received signal and the diffusion code to demodulate the signal. The synchronism detection circuit in FIG. 1 is a circuit for detecting such synchronism. Immediately after the reception side, e.g., a portable telephone, is powered on, or when the reception side is moved to an adjacent cell area, synchronism detection is performed.

The synchronism detection circuit comprises: a plurality of delay circuits 1 to 15, each of which is used to delay a received signal R for a plurality of bits; and a plurality of multiplication circuits 20 to 35, for multiplying outputs R0 to R15 of the delay circuits 1 to 15 by the respective diffusion codes C0 to C15, each of which consists of a plurality of bits. Assuming that the diffusion code includes 16 bits, an integrating circuit 40 performs integral calculations for outputs M0 to M15 of the multiplication circuits 20 to 35. When a result of the integration exceeds a predetermined peak value, a sync detection signal 36 is output.

Figure 2:
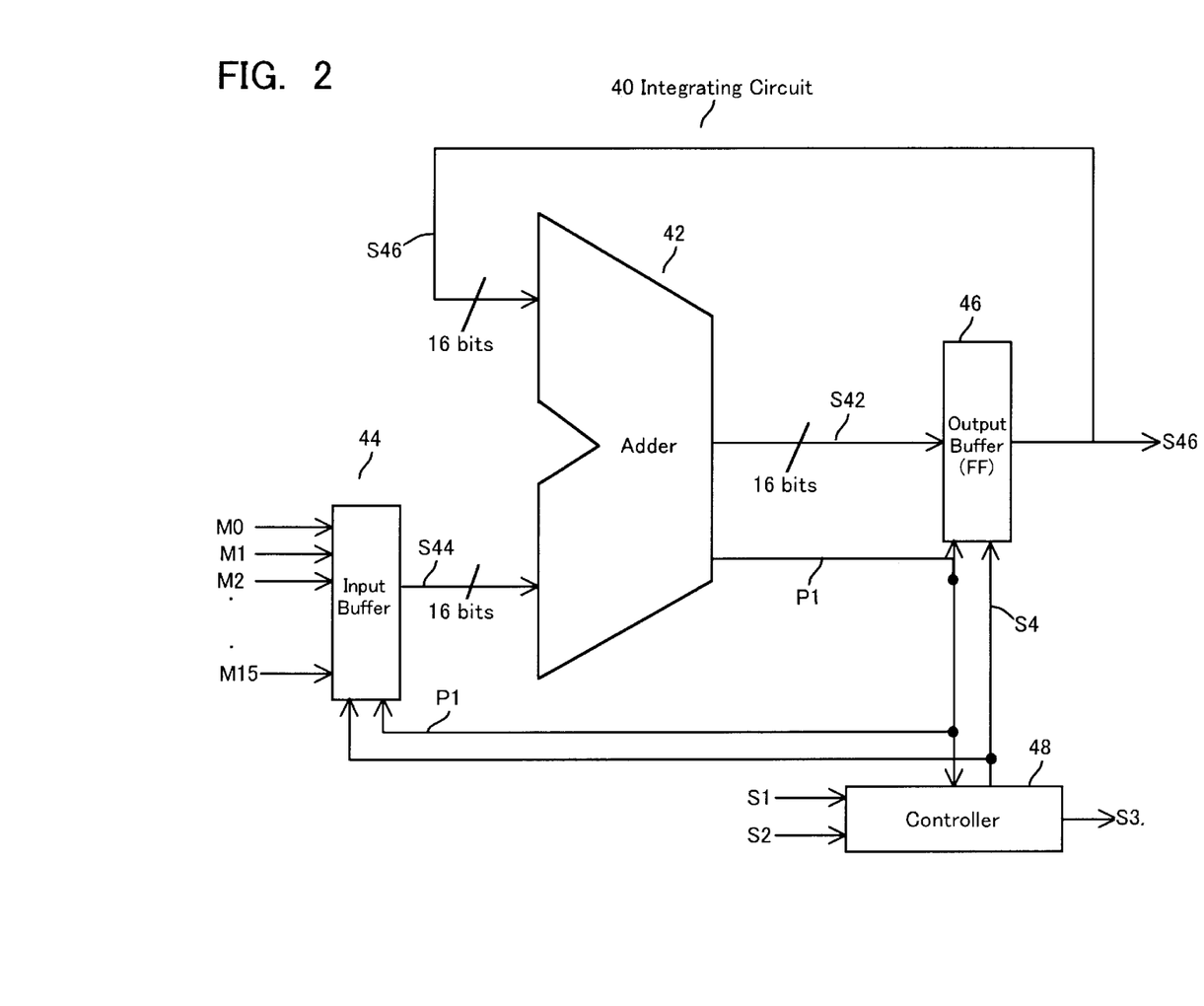
FIG. 2 is a diagram showing the overall arrangement of an integrating circuit according to the embodiment of the present invention.

FIG. 2 is a diagram showing the overall arrangement of the integrating circuit 40 according to the embodiment of the present invention. The integrating circuit 40 comprises: an adder 42; an input buffer 44 for supplying augend data; and an output buffer 46 for latching an addition result S42 provided by the adder 42 and for supplying the addition result S42 as augend data S46 to the adder 42. The input buffer 44 is constituted by, for example, either a multiplexer which sequentially multiplexes 16 augend data sets M0 to M15 in response to a pulse signal P1, or an FIFO buffer which stores the augend data M0 to M15 and sequentially outputs them in response to a pulse signal P1. The output buffer 46 can be constituted by a flip-flop which latches the addition result S42 in response to a pulse signal P1, and supplies it as augend data S46 to the adder 42.

Further, the integrating circuit 40 includes a controller 48 for controlling the start and the end of integral calculations. In response to a calculation start signal S1, the controller 48 renders an integral calculation activation signal S4 active, and monitors the number of additions performed by counting a pulse signal P1 which is generated by the adder 42 each time the addition for each stage is completed. When the count of the additions performed matches the count indicated by calculation count data S2, the controller 48 renders the integral calculation activation signal S4 inactive and outputs a calculation end status signal S3.

In the example in FIG. 2, addend data S44 is a 16-bit digital signal, the lower 8 bits of which are effective bits and the upper 8 bits of which are all 0. The augend data S46 is a digital signal consisting of the lower 16 bits of the addition result data S42. When the addend data S44, the lower 8 bits of which are effective bits, are added a plurality of times, the data S42 is output as the integral result obtained for 16 bits.

The pulse signal P1 is generated in response to the timing at which the adder 42 completes the addition, and is used as a timing pulse for the addition of the next stage. The pulse signal P1 will be described in detail later.

Figure 3:
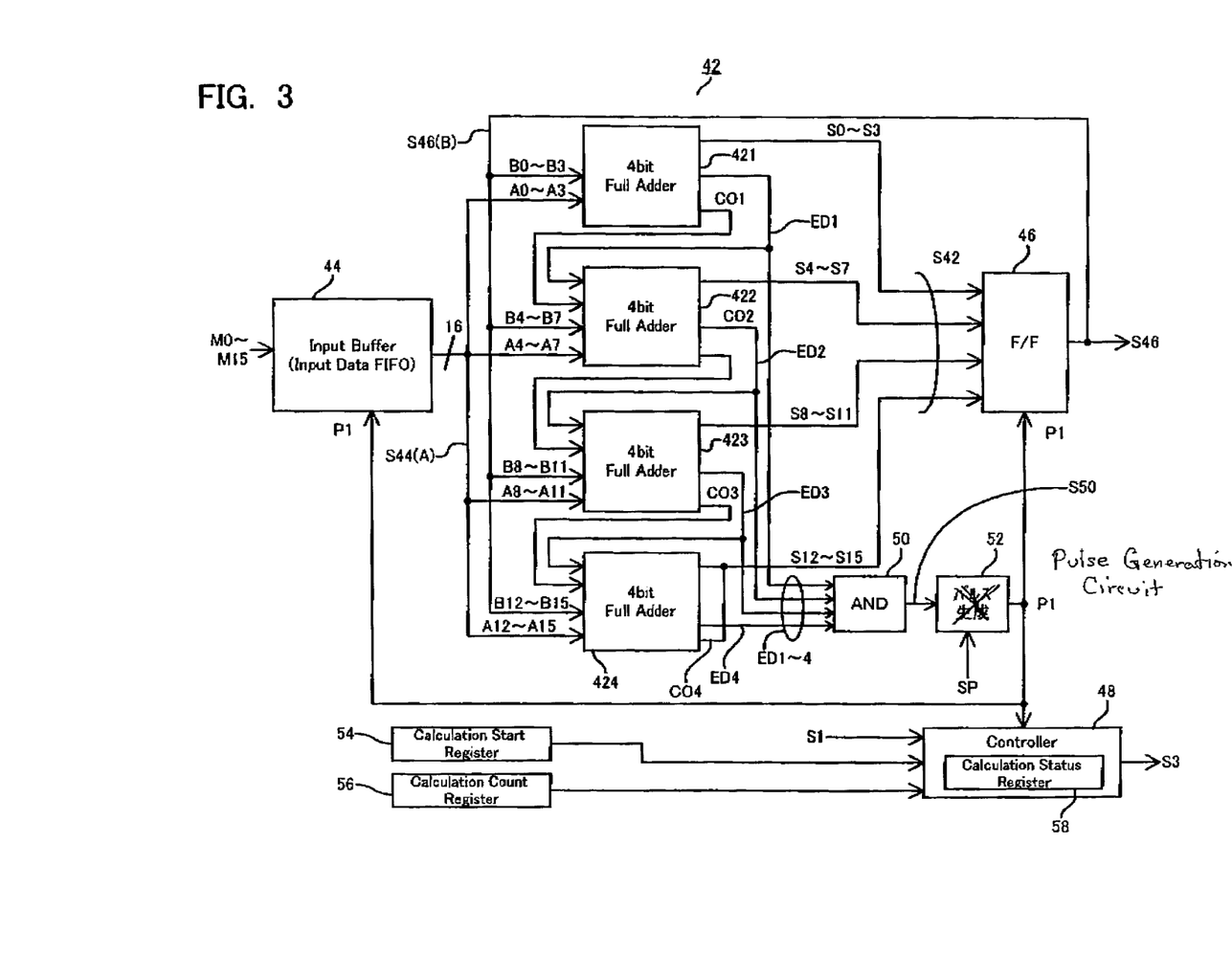
FIG. 3 is a detailed diagram showing the integrating circuit according to the embodiment of the present invention.

FIG. 3 is a detailed diagram showing the integrating circuit according to the embodiment of the present invention. In this example, an input data FIFO (First In First Out) buffer, for storing and outputting in order input data M0 to M15, is used as the input buffer 44. The adder 42 for adding 16 bits is constituted by adder blocks 421 to 424, each of which perform the addition of four bits. The adder block 421 adds the lowest four bits of addend data A0 to A3 to the lowest four bits of augend data B0 to B3, and generates four bits of addition result data S0 bits and a carry-out CO1 corresponding to a carry. The adder block 421 also outputs a block addition end signal ED1 indicating that the calculation performed by the adder block has been completed. The block addition end signal ED1 will be described in detail later.

Similarly, the adder block 422 adds the succeeding four bits of addend data A4 to A7 to augend data B4 to B7, generates four bits of addition result data S4 to S7 and a carry-out CO2, and outputs a block addition end signal ED2. The block addition end signal ED1 and the carry-out CO1 are transmitted from the lower adder block 422 to the adder block 422. The adder blocks 423 and 424 perform the same process, and respectively output addition result data S8 to S11 and S12 to S15, carry-outs CO3 and CO4 and block addition end signals ED3 and ED4.

The addition block end signals ED1 to ED4 are transmitted to AND circuit 50. When all the block addition end signals go to level H, which corresponds to the end of the addition process, an addition end notice signal S50 is output. A pulse generation circuit 52 monitors the addition end notice signal S50 at a fast sampling clock SP. When the pulse generation circuit 52 detects the change of the signal S50 to level H, it outputs a pulse signal P1. In response to the pulse signal P1, the addition result data S0 to S15 are latched at the output buffer 46, and the augend data S46 for the next stage are transmitted to the adder blocks 421 to 424 in the adder circuit, as is described above. Further, in response to the pulse signal P1, the addend data stored in the input data FIFO 44 are shifted and the addend data S44 (A0 to A15) for the next stage are transmitted to the four adder blocks 421 to 424.

The controller 48 is connected to a calculation start register 54 and a calculation count register 56, in which a calculation start signal (S1 in FIG. 2) and calculation count data (S2 in FIG. 2) are respectively stored. When the performance of calculations is begun, the calculation start signal S1, at level H, is written to the calculation start register 54. In accordance with the data written in the registers 54 and 56, the controller 48 controls the start of the calculation performance and the number of calculations that are to be performed, and detects the calculation performance end. A calculation status register 58 is included in the controller 48, and when the number of additions performed equals the count (16 times in this embodiment) written in the calculation count register 56, calculation end status data are written in the calculation status register 58 and a calculation end status signal 48 is output. The end of the calculation performance can be detected by counting the pulse signals P1, one of which is generated each time the calculations performed at a stage are completed.

Instead of providing the calculation start register 54, a calculation start signal S1 may be supplied to the controller 48. In this case, when the calculation start signal S1 goes to level H, the performance of integral calculations is begun, and when a predetermined number of additions have been performed, a calculation end status signal S3 is generated in the above described manner.

Figure 4:
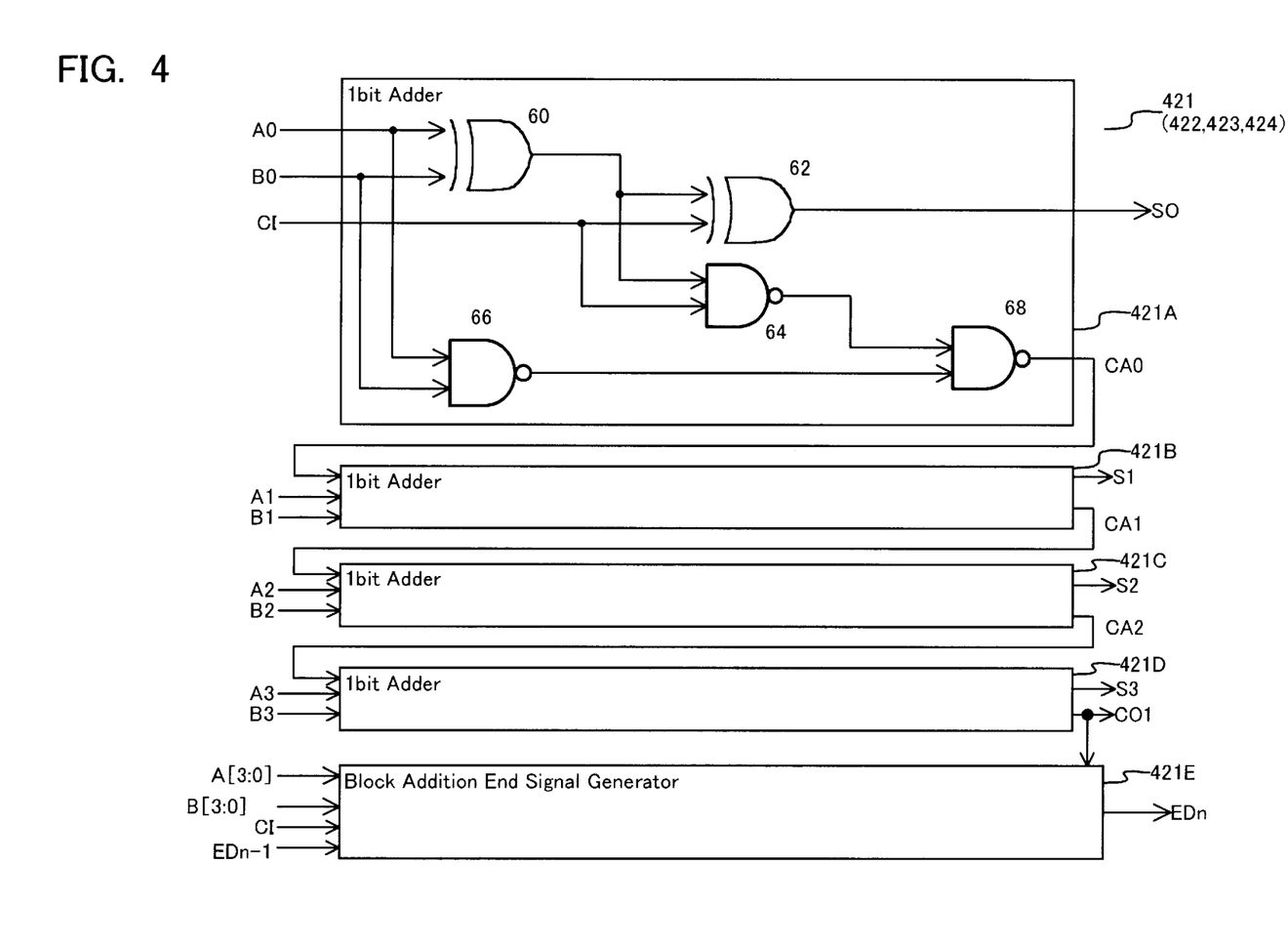
FIG. 4 is a diagram showing an addition block according to the embodiment of the present invention.

FIG. 4 is a diagram showing the adder blocks. The four blocks which constitute the adder circuit in the integrating circuit in FIG. 3 have the same structure. In FIG. 4, reference numerals are specifically provided for the lowest adder block 421. The adder block 421, which is a 4-bit full adder, includes four 1-bit adders 421A to 421D. The circuit structure of the lowest 1-bit adder 421A is shown in FIG. 4. The 1-bit adder 421A includes: an exclusive-OR circuit (EOR) 60, for exclusive-ORing an addend bit A0 and an augend bit B0; an exclusive-OR circuit (EOR) 62, for exclusive-ORing the output of the circuit 60 and a carry-in CI received from the lower adder block; an inverse logical sum (NAND) circuit 64, for NANDing the output of the circuit 60 and the carry-in IN; an inverse logical sum (NAND) circuit 66, for NANDing the addend bit A0 and the augend bit B0; and an inverse logical sum (NAND) circuit 68, for NANDing the outputs of the circuits 64 and 66. Using these circuits, the addition result data S0 and carry CA0 are output.

Figure 5:
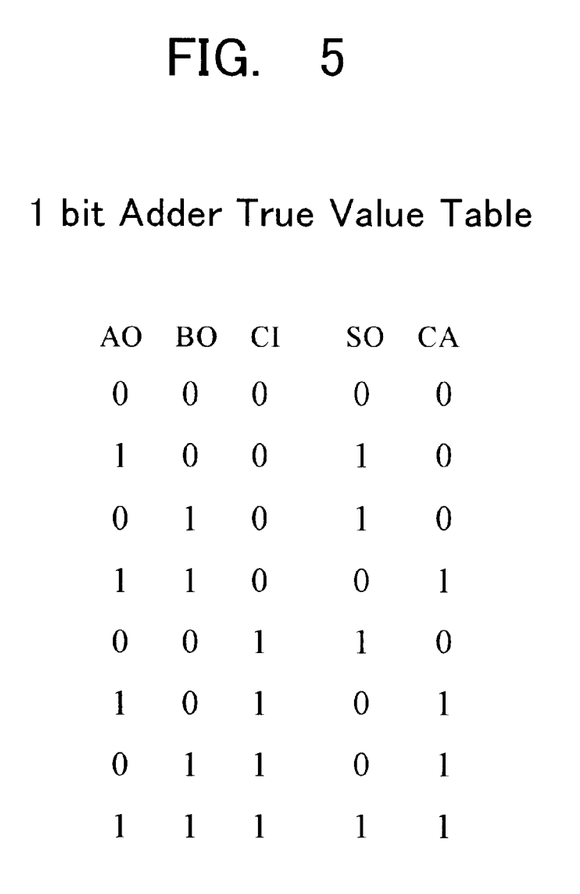
FIG. 5 is a diagram showing a true value table for a one-bit adder.

Though the theory for a 1-bit adder is generally known, for confirmation, a true value table for it is shown in FIG. 5. As is shown in FIG. 5, when only one of the input bits A0, B0 and CI is 1, the addition result data S0 is 1. When two of the input bits A0, B0 and CI are 1, the carry CA is 1. When all of the input bits A0, B0 and CI are 1, the addition result data S0 and the carry CA are 1.

The same logical circuits are employed for the other 1-bit adders 421B, 421C and 421D, and a carry signal from the highest 1-bit adder 421D is used as the carry-out CO1 of the adder block 421.

The adder block 421 further includes a generator 421E for generating a block addition end signal EDn. The block addition end signal generator 421E receives the addend data A[3:0] and the augend data B[3:0], each of which is four bits, which are supplied to the adder block 421, the carry-in CI (the carry-out CO of the lower adder block) supplied by the lower adder block, and the lower addition block end signal EDn−1.

As is shown in FIG. 4, in order to complete the addition in the adder block 421, a carry signal CA0 is generated by the lowest 1-bit adder 421A; in response to this signal a carry signal CA1 is generated by the following 1-bit adder 421B; in response to this signal a carry signal CA2 is generated by the 1-bit adder 421C; and, finally, in response to this signal a carry-out signal CO1 is generated by the 1-bit adder 421D. That is, the addition performed in the pertinent adder block can not be terminated until the logical calculations performed by the lowest 1-bit adder 421A through the last 1-bit adder 421D are completed.

In the adder circuit, the carry-out signal CO1 from the lowest adder block 421 is input as a carry-in signal CI to start the calculations performed in the following adder block 422. If the carry-in signal CI from the lower adder block is not received, the calculations in the adder block 422 can not be performed. Similarly, the addition performed in the following adder block 423 or 424 can not be performed if the carry-in signal CI from the lower adder block is not received.

As is described above, the longest time required for the completion of the calculations in the adder circuit is when a carry occurs for all the bits, from the lowest bit to the highest. Therefore, for the conventional adder circuit, the time it takes for a carry to occur at the highest bit is used to determine the longest timing in advance, and using this timing, the addition result data are latched at the output buffer 46. Further, in the conventional integrating circuit, a latch or shift pulse signal P1 is transmitted to the output buffer 46 and to the input buffer 44 in accordance with the above longest timing. As a result, a plurality of additions are performed at the above longest timing, even when a carry-out does not occur at each adder block according to the set of augend data and addend data.

In the adder block shown in FIG. 4, the block addition end signal generator 421E employs the four bits of addend data A[3:0] and the four bits of augend data B[3:0], and the carry-in signal CI from the lower adder block to determine whether the carry-out signal CO1 occurs in the pertinent block. When the carry-out signal CO1 is not generated, and when the block addition end signal EDn−1 from the lower adder block indicates that the addition processing has been completed, the block addition end signal EDn is generated. When the carry-out signal CO1 occurs, the block addition end signal EDn is generated at the timing at which the carry-out signal CO1 for the pertinent add block is actually generated, and when the addition end signal EDn−1 from the lower adder block indicates that the addition processing has been completed.

As is described above, instead of employing the stacking of carry signals from the four 1-bit adders 421A to 421D, the block addition end signal generator 421E is employed to immediately determine that the carry-out signal CO1 has not been generated in the adder block, and generates the block addition end signal EDn for the pertinent adder block.

Figure 6:
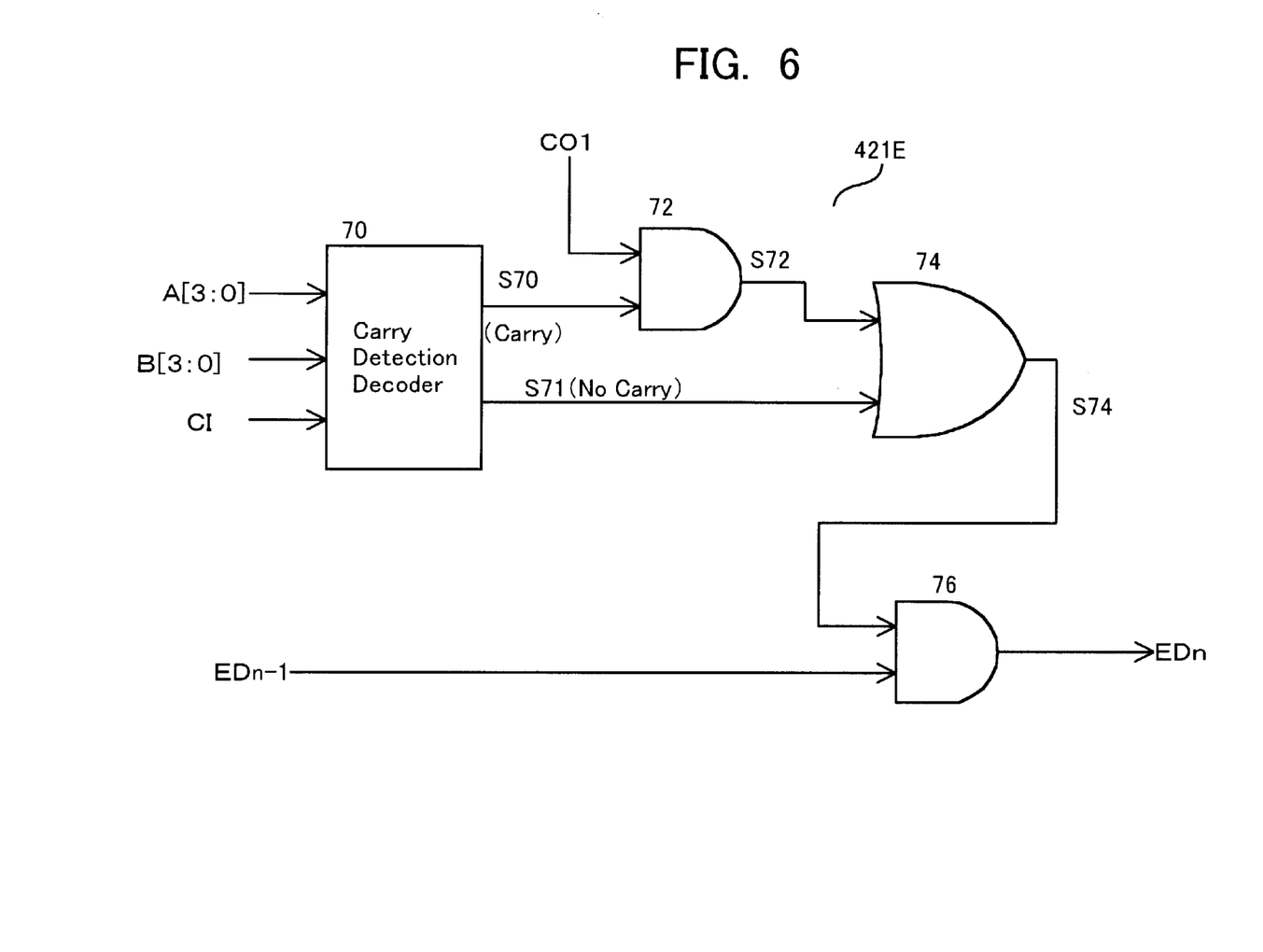
FIG. 6 is a circuit diagram showing a block addition end signal generator.

FIG. 6 is a circuit diagram showing the block addition end signal generator 421E. The block addition end signal generator 421E comprises: a carry detection decoder 70, for receiving, the four bits of addend data A[3:0], the four bits of augend data B[3:0], and a carry-in signal CI from the lower adder block, and for determining whether a carry-out has occurred; a logical sum (OR) circuit 74 and logical product circuits (ANDS) 72 and 76. For the lowest adder block, the lower carry-in signal CI is set to 0, and the lower block addition end signal EDn−1 is set to 1.

Figure 7:
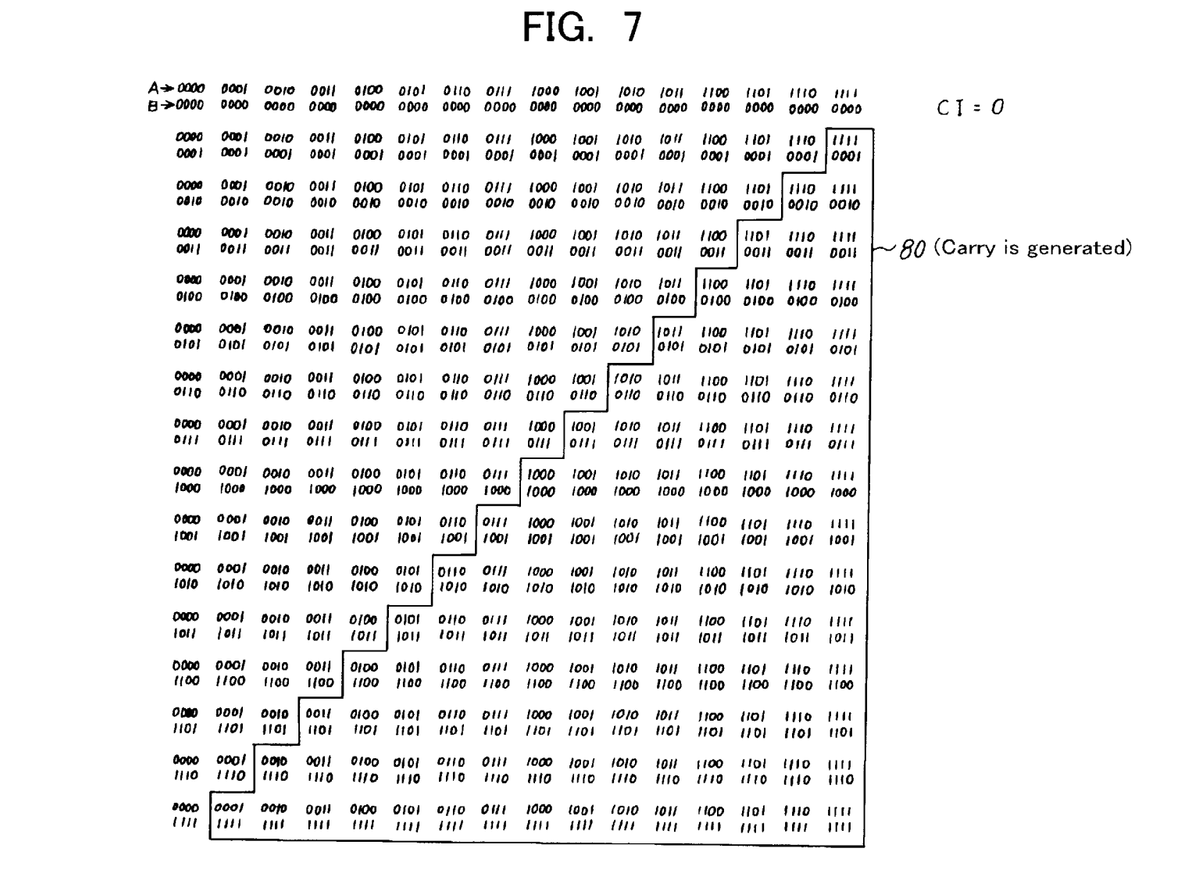
FIG. 7 is a diagram for explaining the decoding theory of a carry detection decoder.
Figure 8:
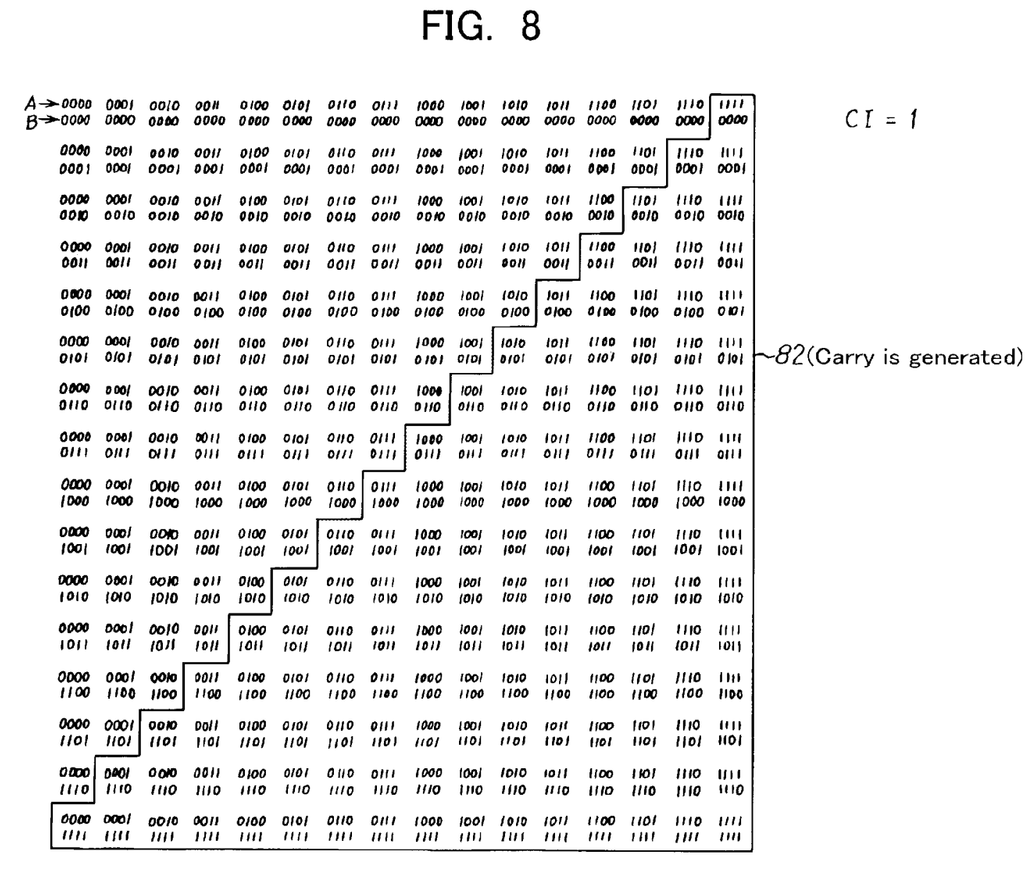
FIG. 8 is a diagram for explaining the decoding theory of the carry detection decoder.

FIGS. 7 and 8 are tables for explaining the decoding theory of the carry detection decoder 70 in FIG. 6. In FIGS. 7 and 8, all the sets of four bits of addend data A and four bits of augend data B are shown. For example, in the first row, 16 types of addend data A are shown relative to augend data B=0000, and in the second row, 16 types of addend data A are shown relative to augend data B=0001. That is, in the tables, the addend data A is changed in the direction of the rows, and the augend data B is changed in the direction of the columns. Combinations 80 and 82 at the lower right of the tables correspond to those for which a carry in the pertinent block has occurred.

The table in FIG. 7 is for a case wherein the carry-in CI from the lower adder block is 0, and the table in FIG. 8 is for a case wherein the carry-in CI from the lower adder block is 1. Therefore, the number of sets 82 in FIG. 8 is 16 more than the number of sets 80 in FIG. 7.

Referring to FIG. 6 again, the carry detection decoder 70 raises, to level H, the signal S70 which indicates that a carry-out has occurred for the sets 80 and 82 in FIGS. 7 and 8. For the other set, the carry detection decoder 70 raises, to level H, a signal S71 indicating that carry has not occurred. The circuit structure of the carry detection decoder 70 is the same as a common decoder, and in accordance with the combination of nine bits, the decoder 70 increases, to level H, the signal S70 indicating that a carry has occurred or the signal S71 indicating that no carry has occurred.

As is apparent from the circuit structure in FIG. 6, when the signal S71, indicating no carry has occurred, goes to level H, the output S74 of the OR circuit 74 goes to level H, regardless of the carry-out signal CO1 in the pertinent adder block. And when the lower block addition end signal EDn-1 goes to level H, the AND circuit 76 raises the block addition end signal EDn to level H. In this case, the block addition end signal EDn is generated before the performance of the addition has actually been terminated.

When the signal S70 indicating a carry had occurred goes to level H, and the output S72 of the AND circuit 72 also goes to level H, in response to the timing when the carry-out signal CO1 in the pertinent adder block goes to level H, so that in accordance with the above described logic, the block addition end signal EDn goes to level H. In this case, the generation of the block addition end signal EDn is performed using the same timing as that at which the performance of the addition is actually terminated.

Referring to FIG. 3 again, assuming that the carry-out signals CO1, CO2, CO3 and CO4 do not occur in the adder blocks 4221, 422, 423 and 424, since the addition performed by the adder circuit is completed when the addition performed in each adder block has been terminated, the time required until the addition performed by the overall adder circuit is ended can be reduced by using the block addition end signal ED in this embodiment, to substantially the same as that required for the addition performed by one adder block. When carry-out signals occur at all of the adder blocks, the addition performed by the overall adder circuit is not terminated until the serial operations performed by the 1-bit adders in 16 stages have been completed. Therefore, in this embodiment, the integral calculation time can be shorter than the time which is conventionally required when the integral calculation is performed in sync with the calculation clock set to the longest calculation time.

Figure 9:
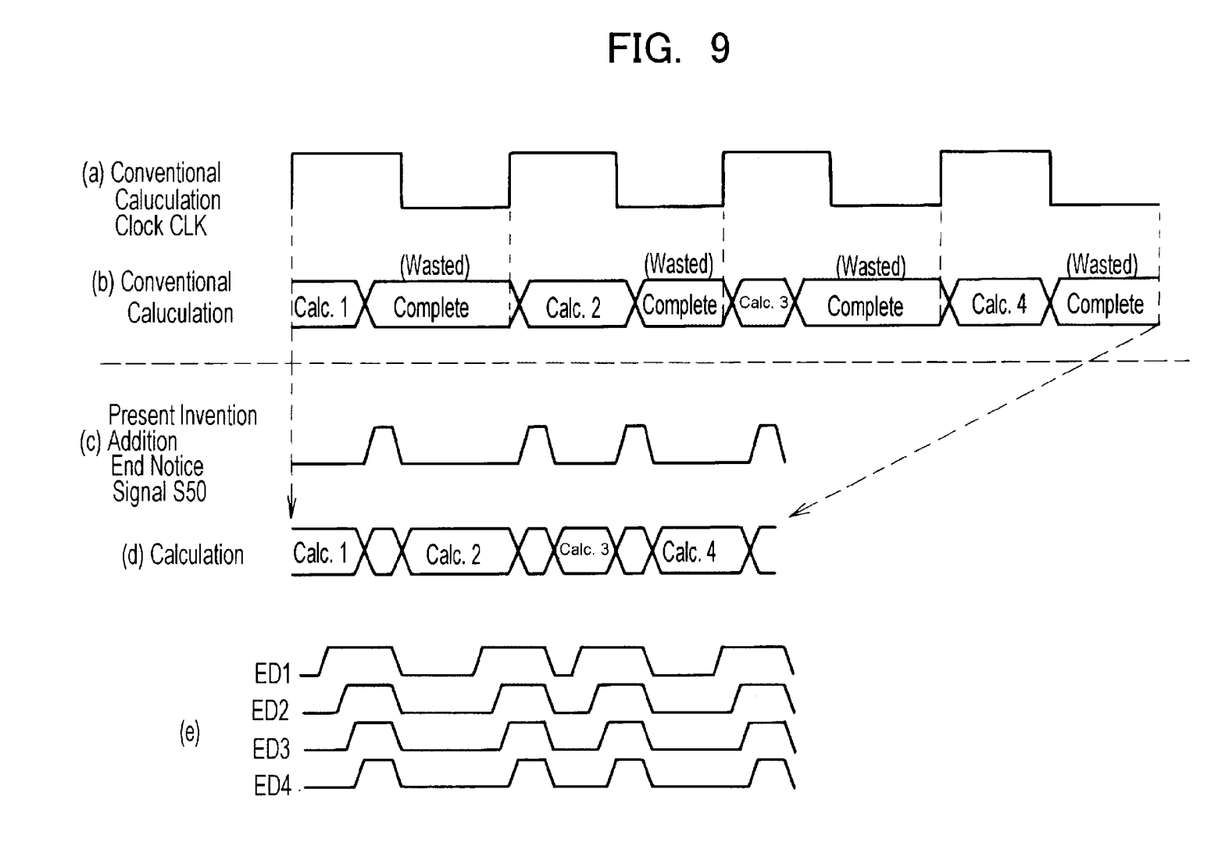
FIG. 9 is a timing chart for comparing a conventional calculation time with a calculation time required for the embodiment of the present invention.

FIGS. 9A to 9E are timing charts for comparing the calculation time required for this embodiment with the conventional calculation time. In the timing charts, four additions are performed for integral calculation. Conventionally, the calculation clock CLK has a comparatively long cycle, and the addition performed at each stage is started at the leading edge of the calculation clock CLK. That is, the timing for starting the addition for each stage is uniformly determined by the calculation clock CLK. Therefore, as is shown in FIG. 9B, when the performance of the calculations is completed before the end of the cycle for the calculation clock CLK, the time from the point at which the calculations were completed until the calculations for the next stage were started is wasted.

According to this embodiment, the addition for each stage is not performed in accordance with a uniform calculation clock, but instead, the integrating circuit voluntarily performs addition for a plurality of stages. The timing for ending addition 1 is obtained by the addition end notice signal S50, which is generated in accordance with the timing at which the block addition end signals ED1 to ED4, from the four adder blocks, go to level H. As is shown in FIG. 3, the addition end notice signal S50 is supplied to the pulse generation circuit 52, and the pulse signal P1 is generated to initiate the processing for the next addition.

When the above described integrating circuit is employed for the synchronism detection circuit in FIG. 1, the time required to prepare and use a CDMA portable telephone for communication can be reduced.

In the above embodiment, the adder block adds four bits of addend data to four bits of augend data; however, the data used for the present invention is not limited to four bits. As was described while referring to FIG. 6, if the lower addition block end signal EDn-1 does not go to level H, the block addition end signal generator in each block does not raise the block addition end signal EDn of the pertinent addition block. Therefore, instead of employing the AND circuit 50 to calculate the logical product of the block addition end signals ED1 to ED4, which are received from the adder blocks in FIG. 3, only the block addition end signal ED4 from the highest adder block must be transmitted to the pulse generation circuit 52 to detect the end of the addition processing. When the adder circuit is constituted by a carry look-ahead system, it is preferable that the logical product be calculated for the block addition end signals ED1 to ED4 of the individual adder blocks.

According to the present invention, the addition end timing can be detected, the self-operating integrating circuit can be provided, and depending on the data which is to be calculated, integral calculations can be performed in a short time. Further, since the integrating circuit is voluntarily operated without the use of a fast clock being required, the generation of a clock for the synchronism detection circuit is not required for a portable telephone, and the power consumed and the time required to establish synchronism can be reduced.

What is claimed is:

1. An adder circuit, which receives addend data and augend data, each of which consists of a plurality of bits, and sums said addend and augend data, comprising:

a plurality of adder blocks, each of which has an adder for adding a predetermined number of bits of said addend data to the predetermined number of bits of said augend data, and for outputting both the addition result having said predetermined number of bits and a carry-out signal, wherein, each adder block further has a block addition end signal generator for generating a block addition end signal which indicates that the addition performed by said adder block has been completed, said block addition end signal generator including a carry detection decoder for detecting a carry-out of said adder block by decoding a carry-out signal from a lower adder block, said addend data, and said augend data, said block addition end signal generator; generating said block addition end signal in response to the carry-out of the adder block, when the carry-out is detected by the carry detection decoder, and not in response to the carry-out of the adder block, when the carry-out is not detected by the carry detection decoder.

2. The adder circuit according to claim 1, wherein block addition end signals are received from said plurality of adder blocks, and in response to the timing at which all the block addition end signals indicate addition has been completed, an addition end signal for said adder circuit is generated.

3. The adder circuit according to claim 1, wherein, in response to a block addition end signal from the highest adder block, an addition end signal for said adder circuit is generated.

4. An integrating circuit comprising:
an adder circuit, which receives addend data and augend data, each of which consists of a plurality of bits, and sums said addend and augend data, having
a plurality of adder blocks, each of which has an adder for adding a predetermined number of bits of said addend data to the predetermined number of bits of said augend data, and for outputting both the addition result having said predetermined number of bits and a carry-out signal,
wherein, each adder block further has a block addition end signal generator for generating a block addition end signal which indicates that the addition performed by said adder block has been completed, said block addition end signal generator including a carry detection decoder for detecting a carry-out of said adder block by decoding a carry-out signal from a lower adder block, said addend data, and said augend data,
said block addition end signal generator generating said block addition end signal in response to the carry-out of the adder block, when the carry-out is detected by the carry detection decoder, and not in response to the carry-out of the adder block, when the carry-out is not detected by the carry detection decoder, and
block addition end signals are received from said plurality of adder blocks, and in response to the timing at which all the block addition end signals indicate addition has been completed, an addition end signal for said adder circuit is generated;
an addend data input buffer for recording the addend data; and
an addition result buffer for recording the results of the addition and for outputting the augend data,
wherein, in response to the addition end signal, said addend data and said augend data are supplied from said addition data input buffer and said addition result buffer to the plurality of adder blocks.

5. The integrating circuit according to claim 4, wherein, in response to said addition end signal, the addition result obtained by said plurality of adder blocks are latched in said addition result buffer.

6. The integrating circuit according to claim 4, further comprising:
an integrating controller for, when integral calculating is begun, beginning to supply data from said addend data input buffer and said addition result buffer, and for permitting said adder circuit to repeatedly perform the addition a number of times that corresponds to said integral calculation.

7. A synchronism detection circuit, which detects the synchronism of diffusion code for a received signal subject to a code diffusion, comprising:
an integrating circuit including,
an adder circuit, which receives addend data and augend data, each of which consists of a plurality of bits, and sums said addend and augend data, having
a plurality of adder blocks, each of which has an adder for adding a predetermined number of bits of said addend data to the predetermined number of bits of said augend data, and for outputting both the addition result having said predetermined number of bits and a carry-out signal,
wherein, each adder block further has a block addition end signal generator for generating a block addition end signal which indicates that the addition performed by said adder block has been completed, said block addition end signal generator including a carry detection decoder for detecting a carry-out of said adder block by decoding a carry-out signal from a lower adder block, said addend data, and said augend data,
said block addition end signal generator generating said block addition end signal in response to the carry-out of the adder block, when the carry-out is detected by the carry detection decoder, and not in response to the carry-out of the adder block, when the carry-out is not detected by the carry detection decoder, and
block addition end signals are received from said plurality of adder blocks, and in response to the timing at which all the block addition end signals indicate addition has been completed, an addition end signal for said adder circuit is generated;
an addend data input buffer for recording the addend data; and
an addition result buffer for recording the results of the addition and for outputting the augend data,
wherein, in response to the addition end signal, said addend data and said augend data are supplied from said addition data input buffer and said addition result buffer to the plurality of adder blocks;
a plurality of delay circuits, each of which delays said received signal having a plurality of bits; and
a plurality of multiplication circuits for multiplying by the outputs of said plurality of delay circuits and the diffusion code having a plurality of bits respectively,
wherein the outputs of said multiplication circuits are accumulated by said integrating circuit, and said synchronism is detected according to the accumulation result.

8. The synchronism detection circuit according to claim 7, wherein, in response to said addition end signal, the addition result obtained by said plurality of adder blocks are latched in said addition result buffer.

9. The synchronism detection circuit according to claim 7, further comprising:
an integrating controller for, when integral calculating is begun, beginning to supply data from said addend data input buffer and said addition result buffer, and for permitting said adder circuit to repeatedly perform the addition a number of times that corresponds to said integral calculation.

10. An integrating circuit comprising:
an adder circuit, which receives addend data and augend data, each of which consists of a plurality of bits, and sums said addend and augend data, having
a plurality of adder blocks, each of which has an adder for adding a predetermined number of bits of said addend data to the predetermined number of bits of said augend data, and for outputting both the addition result having said predetermined number of bits and a carry-out signal, wherein, each adder block further has a block addition end signal generator for generating a block addition end signal which indicates that the addition performed by said adder block has been completed, said block addition end signal generator including a carry detection decoder for detecting a carry-out of said adder block by decoding a carry-out signal from a lower adder block, said addend data, and said augend data, said block addition end signal generator generating said block addition end signal in response to the carry-out of the adder block, when the carry-out is detected by the carry detection decoder, and not in response to the carry-out of the adder block, when the carry-out is not detected by the carry detection decoder, and, in response to a block addition end signal from the highest adder block, an addition end signal for said adder circuit is generated;

an addend data input buffer for recording the addend data; and an addition result buffer for recording the results of the addition and for outputting the augend data, wherein, in response to the addition end signal, said addend data and said augend data are supplied from said addition data input buffer and said addition result buffer to the plurality of adder blocks.

11. The integrating circuit according to claim 10, wherein, in response to said addition end signal, the addition result obtained by said plurality of adder blocks are latched in said addition result buffer.

12. The integrating circuit according to claim 10, further comprising:

an integrating controller for, when integral calculating is begun, beginning to supply data from said addend data input buffer and said addition result buffer, and for permitting said adder circuit to repeatedly perform the addition a number of times that corresponds to said integral calculation.

13. A synchronism detection circuit, which detects the synchronism of diffusion code for a received signal subject to a code diffusion, comprising:

an integrating circuit including, an adder circuit, which receives addend data and augend data, each of which consists of a plurality of bits, and sums said addend and augend data, having a plurality of adder blocks, each of which has an adder for adding a predetermined number of bits of said addend data to the predetermined number of bits of said augend data, and for outputting both the addition result having said predetermined number of bits and a carry-out signal, wherein, each adder block further has a block addition end signal generator for generating a block addition end signal which indicates that the addition performed by said adder block has been completed, said block addition end signal generator including a carry detection decoder for detecting a carry-out of said adder block by decoding a carry-out signal from a lower adder block, said addend data, and said augend data, said block addition end signal generator generating said block addition end signal in response to the carry-out of the adder block, when the carry-out is detected by the carry detection decoder, and not in response to the carry-out of the adder block, when the carry-out is not detected by the carry detection decoder, and, in response to a block addition end signal from the highest adder block, an addition end signal for said adder circuit is generated;

an addend data input buffer for recording the addend data; and an addition result buffer for recording the results of the addition and for outputting the augend data, wherein, in response to the addition end signal, said addend data and said augend data are supplied from said addition data input buffer and said addition result buffer to the plurality of adder blocks;

a plurality of delay circuits, each of which delays said received signal having a plurality of bits; and a plurality of multiplication circuits for multiplying by the outputs of said plurality of delay circuits and the diffusion code having a plurality of bits respectively, wherein the outputs of said multiplication circuits are accumulated by said integrating circuit, and said synchronism is detected according to the accumulation result.

14. The synchronism detection circuit according to claim 13, wherein, in response to said addition end signal, the addition result obtained by said plurality of adder blocks are latched in said addition result buffer.

15. The synchronism detection circuit according to claim 13, further comprising:

an integrating controller for, when integral calculating is begun, beginning to supply data from said addend data input buffer and said addition result buffer, and for permitting said adder circuit to repeatedly perform the addition a number of times that corresponds to said integral calculation.

* * * * *